United States Patent
Kouno (10) Patent No.: US 6,404,709 B1
(45) Date of Patent: Jun. 11, 2002

(54) OPTICAL PICKUP DEVICE

(75) Inventor: Akira Kouno, Tokorozawa (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/349,026

(22) Filed: Jul. 7, 1999

(30) Foreign Application Priority Data

Jul. 8, 1998 (JP) ............................................ 10-192584

(51) Int. Cl.[7] ................................................ G11B 7/09
(52) U.S. Cl. ............................... 369/44.23; 369/112.04; 369/112.09; 369/112.28
(58) Field of Search .......................... 369/44.23, 44.12, 369/44.37, 44.38, 112.06, 112.09, 112.14, 112.21, 112.28, 110.04

(56) References Cited

U.S. PATENT DOCUMENTS

| | | | | | |
|---|---|---|---|---|---|
| 4,775,968 | A | * | 10/1988 | Ohsato ..................... | 369/44.37 |
| 5,068,843 | A | * | 11/1991 | Takeshita et al. ......... | 369/44.37 |
| 5,113,387 | A | * | 5/1992 | Goldsmith et al. ...... | 369/44.38 |
| 5,696,749 | A | * | 12/1997 | Brazas, Jr. et al. ..... | 369/112.09 |
| 6,084,841 | A | * | 7/2000 | Sugiura et al. ........ | 369/112.21 |
| 6,154,433 | A | * | 11/2000 | Hoshino et al. ......... | 369/44.23 |
| 6,195,315 | B1 | * | 2/2001 | Takahashi et al. ....... | 369/44.23 |
| 6,240,053 | B1 | * | 5/2001 | Akiyama ................. | 369/44.23 |

FOREIGN PATENT DOCUMENTS

DE          3827761 A  *  3/1989

* cited by examiner

Primary Examiner—Thang V. Tran
(74) Attorney, Agent, or Firm—Perman & Green, LLP

(57) ABSTRACT

A small optical pickup apparatus which can record and reproduce different optical discs by one optical pickup device. The optical pickup device is constructed by: a main portion having a first light source to emit a first laser beam, a second light source to emit a second laser beam having a wavelength different from a wavelength of the first laser beam, and a photodetecting portion to receive first and second return light of the first and second laser beams which are reflected and returned from an optical disc; and an optical axis coupling prism which is fixed to the main portion and has a first plane of incidence where the first laser beam enters, a second plane of incidence where the second laser beam enters, a plane of synthesis to make optical axes of the first and the second laser beams coincident, and a plane of emission to emit the first and the second laser beams which pass through the plane of synthesis whose optical axes are made coincident.

19 Claims, 5 Drawing Sheets

OPTICAL PICKUP DEVICE

BACKGROUND OF THE INVENTION

1. Field of the Invention

The invention relates to an optical system of optical pickup for use in an optical recording and reproducing apparatus that records and reproduces information to and from optical discs having different thicknesses of the substrate or designed for different wavelengths. More particularly, the invention relates to an optical pickup device.

2. Description of Related Art

As a type of optical recording and reproducing apparatuses, there is an optical disc player which can read recording information from an optical disc such as the so called LD (laser disc), CD (compact disc), DVD (digital versatile disc, or digital video disc), or the like used an optical recording medium. There also is a compatible disc player which can read information from any one of those optical discs.

Among those optical discs as optical information recording media, a numerical aperture NA of an objective lens, a thickness of substrate, an optimum reading light wavelength, and the like are designed by different specifications. To realize an optical pickup of a CD/DVD compatible player, therefore, it is necessary to compensate at least two differences of the numerical aperture NA and the substrate thickness.

An objective lens which is used in a general optical pickup using a semiconductor laser is manufactured in consideration of the substrate thickness of the optical disc and its corresponding wavelength. As for an optical disc having a different thickness or corresponding wavelength, since a spherical aberration occurs, the recording and reproduction cannot be performed. Hitherto, a substrate thickness of the optical disc which is used as an LD, CD, CD-R (CD Recordable), etc. is equal to 1.2 mm, a corresponding wavelength lies within a range of 780 to 830 nm, and a numerical aperture of the objective lens is equal to about 0.45. A substrate thickness of the DVD is equal to 0.6 mm, a corresponding wavelength lies within a range from 635 to 655 nm, and a numerical aperture of the objective lens is equal to about 0.6.

First, by increasing the numerical aperture of the objective lens, optical resolution is improved and a recordable or reproducible frequency band can be widened. If there is a tilt of the optical disc, a coma-aberration of a light spot increases to a value that is equal to or larger than the conventional one. By making the substrate thickness of the optical disc thin, however, the coma-aberration occurring due to the tilt of the optical disc can be suppressed to a level similar to the conventional one.

By reducing the use wavelength, optical resolution is improved and the recordable or reproducible frequency band can be widened in a manner similar to the case of increasing the numerical aperture of the objective lens.

However, if a CD-R having a wavelength of 780 nm (nanometers) which is used for an LD, CD, or the like is reproduced by a semiconductor laser of a short wavelength, for example, 650 nm, there will be a problem that an enough reproduction signal or control signal cannot be obtained due to such a cause as a difference of reflectance, or absorption factor of the recording surface. With the construction of the conventional compatible player as mentioned above, a reading spot is formed by a common single light source and, usually, a light source to emit a reading light having a wavelength 650 nm that is optimum to reproduce the DVD is used in common upon reproduction of a CD. It is, therefore, impossible to reproduce a recordable disc of the CD-R which can be written once by a light source having a wavelength of 780 nm.

It is thus impossible to reproduce both of a DVD corresponding to the wavelength 650 nm and the CD-R by one optical pickup. It is, therefore, necessary to provide an optical pickup using 650 nm for reproduction of a high density optical disc and an optical pickup for reproduction of a CD and a CD-R, respectively.

However, if the optical system including a prism, a lens, and the like is produced by using a plurality of light sources, there arises a problem that the optical pickup or the whole head becomes complicated and increases in size.

OBJECT AND SUMMARY OF THE INVENTION

The invention is made in consideration of the above problems and it is an object of the invention to provide a small optical pickup apparatus of low cost in which optical discs having different thicknesses of substrates or different corresponding wavelengths can be recorded and reproduced by one optical pickup device.

According to the invention, there is provided an optical pickup device comprising:

a main portion having a first light source to emit a first laser beam, a second light source to emit a second laser beam having a wavelength different from a wavelength of the first laser beam, and a photodetecting portion to receive first and second return light of the first and the second laser beams which are reflected and returned from an optical disc; and an optical axis coupling prism which is fixed to the main portion and has a first plane of incidence where the first laser beam enters, a second plane of incidence where the second laser beam enters, a plane of synthesis to make optical axes of the first and the second laser beams coincident, and a plane of emission to emit the first and the second laser beams which have passed through the plane of synthesis and whose optical axes are made coincident.

In the optical pickup device of the invention, the optical axis coupling prism has a reflecting surface to reflect the second laser beam to the plane of synthesis.

In the optical pickup device of the invention, the plane of synthesis is a dichroic mirror having an incident angle dependency.

In the optical pickup device of the invention, the reflecting surface and the plane of synthesis are arranged in parallel.

In the optical pickup device of the invention, the plane of emission and the first plane of incidence are arranged in parallel.

In the optical pickup device of the invention, the first and the second planes of incidence are arranged in parallel.

In the optical pickup device of the invention, the optical axis coupling prism has a first light separating device, arranged between the second plane of incidence and the plane of synthesis, for generating two sub laser beams which are deviated from the optical axis of the second laser beam.

In the optical pickup device of the invention, the plane of emission has a second light separating device for receiving the first and the second return light and dividing and converging the first and the second return light to different positions on the photodetecting portion, respectively.

In the optical pickup device of the invention, the second light separating device divides each of the first and the second return light into four light beams.

In the optical pickup device of the invention, the photodetecting portion has: a first photodetecting portion for receiving the first return light and outputting a detection signal to form a tracking error signal of a differential phase detection method; and a second photodetecting portion for receiving the second return light and outputting a detection signal to form a tracking error signal of a 3-beam system.

In the optical pickup device of the invention, the first photodetecting portion of the photodetecting portion has a region extended in the direction corresponding to the radial direction of the optical disc in order to receive both of the first and the second return light.

According to the invention, the light source is provided for every corresponding disc and the optical axes of the first and the second laser beams can be made coincident in the optical axis coupling prism, and further, a grating function and a hologram function can be added, so that the number of parts can be reduced and it is possible to easily manufacture the device. Thus, the optical pickup optical system can be simplified.

DETAILED DESCRIPTION OF THE PREFERRED EMBODIMENT

An embodiment of the invention will now be described hereinbelow with reference to the drawings.

(Optical pickup apparatus)

Figure 1:
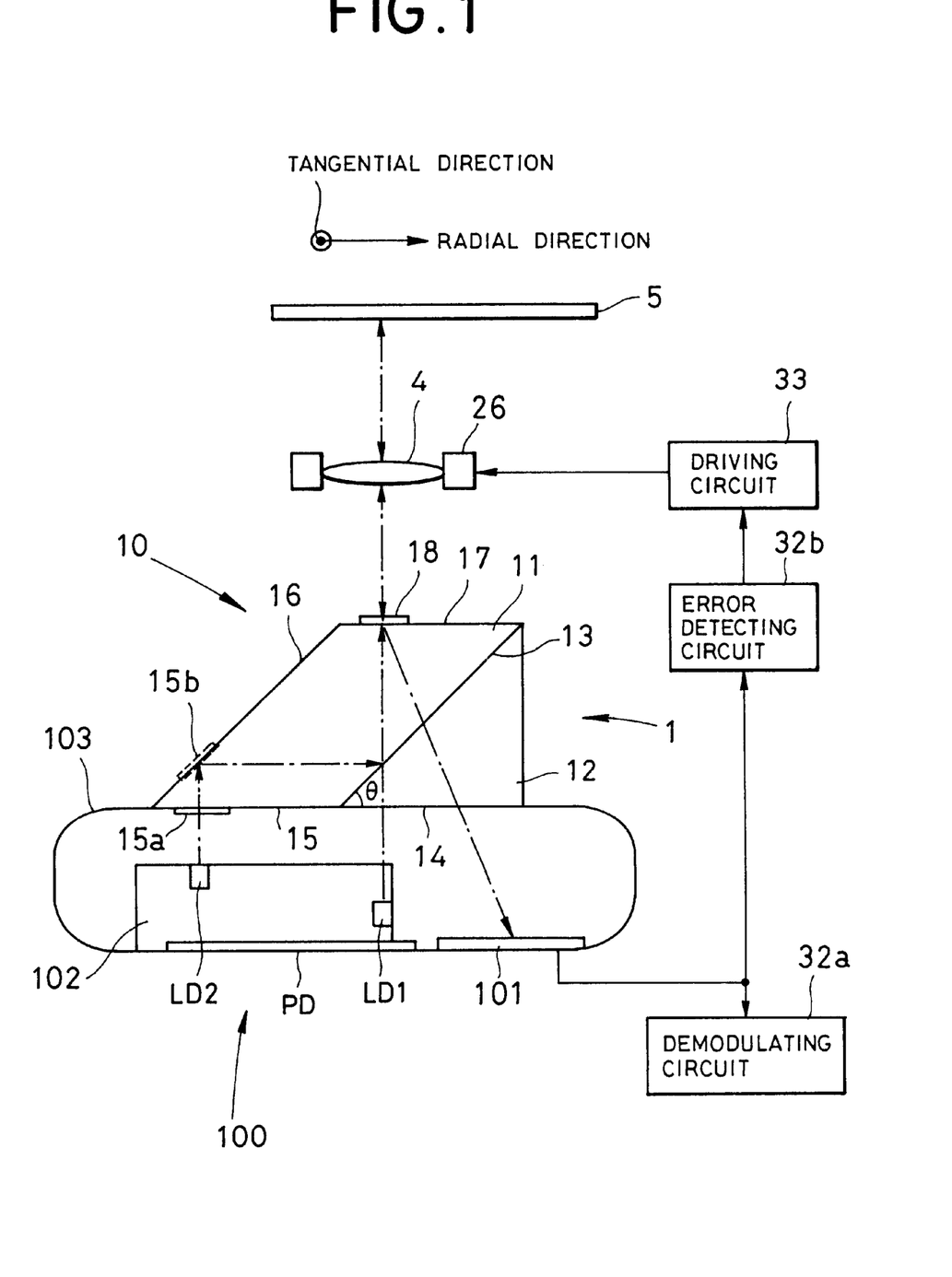
FIG. 1 is a schematic diagram showing an internal structure of an optical pickup device using an optical axis coupling prism as an embodiment of the invention.

FIG. 1 shows an outline of an optical pickup apparatus in the embodiment. The optical pickup apparatus includes a pickup device 1 for emitting and receiving a laser beam for reading and writing. An objective lens 4 is arranged in the downstream of an optical axis of a light output of the pickup device 1. The objective lens 4 converges both of the laser beams to an optical disc 5 and forms a light spot, transmits the reflection light as a return light from the optical disc 5, and guides it to the pickup device 1.

As an objective lens 4, it is also possible to use a composite objective lens comprising: a condenser lens as a convex lens to converge the laser beam; and a Fresnel lens or a hologram lens of a translucent flat plate which is coaxially arranged on an optical axis of the condenser lens and functions as a concave lens. In place of the hologram lens, it is also possible to use a double focal point composite objective lens as a condenser lens itself or to change a numerical aperture by a liquid crystal device.

The optical pickup apparatus has a driving mechanism 26 of the objective lens including a tracking actuator and a focusing actuator. The focusing actuator in the objective lens driving mechanism moves the objective lens 4 in the direction perpendicular to the recording surface of the optical disc 5. The tracking actuator drives the objective lens 4 in the radial direction of the optical disc 5.

The optical pickup apparatus is controlled by a demodulating circuit 32a and an error detecting circuit 32b. A photodetecting portion of the pickup device 1 which received the return light from the light spot supplies an electric signal according to a spot image formed on each of the photo receiving surfaces to the demodulating circuit 32a and error detecting circuit 32b. The demodulating circuit 32a generates a recording signal RF on the basis of the electric signal. The error detecting circuit 32b generates a focusing error signal, a tracking error signal, other servo signals, and the like on the basis of the electric signal and supplies each of the driving signals to each actuator through an actuator driving circuit 33, thereby servo control driving the objective lens 4 and the like in response to each driving signal.

(Optical pickup device)

An optical pickup device which is used in the optical pickup apparatus is basically constructed by a trapezoidal optical axis coupling prism 10 and a main portion 100.

The main portion 100 of the optical pickup device comprises: semiconductor lasers LD1 and LD2; a monitor photodetector PD for a back light; and a casing 103 having therein a photodetecting portion 101 and a supporting portion 102. The semiconductor laser LD1 for a DVD (for example, 650 nm having a wavelength of the first laser beam) and the semiconductor laser LD2 for a CD (for example, 780 nm of a wavelength of the second laser beam) are attached to the supporting portion 102 also functioning as a common single heat sink at precision of a mechanical level. The supporting portion 102 of the semiconductor lasers LD1 and LD2 is further fixed onto the casing 103 of a housing. As shown in the diagram, the first and the second semiconductor lasers LD1 and LD2 are arranged along the axis corresponding to the radial direction of the optical disc and supported so that the optical axes of the laser beams that are emitted from the semiconductor lasers are in parallel and directed upward of the casing 103.

The monitor photodetector PD is used to detect the light from the back sides of the semiconductor lasers LD1 and LD2 and feedback control both of the semiconductor lasers.

The optical axis coupling prism 10 is fixed onto the casing 103 of the main portion. The first and the second laser beams of the first and second semiconductor lasers LD1 and LD2 enter the prism 10, from which the laser beams are emitted with the coincident optical axis. The first and the second semiconductor lasers LD1 and LD2 are switched and lit on as a laser for a DVD and a laser for a CD.

The split photo receiving surface of the photodetecting portion 101 to detect a light intensity is formed in the lower portion of the casing 103 so as to receive the reflection light from the light spot through the optical axis coupling prism 10. The position of the optical axis coupling prism 10 is set in consideration of the relative positional relation between the first and the second semiconductor lasers LD1 and LD2 and the split photo receiving surface of the photodetecting portion 101.

Figure 2:
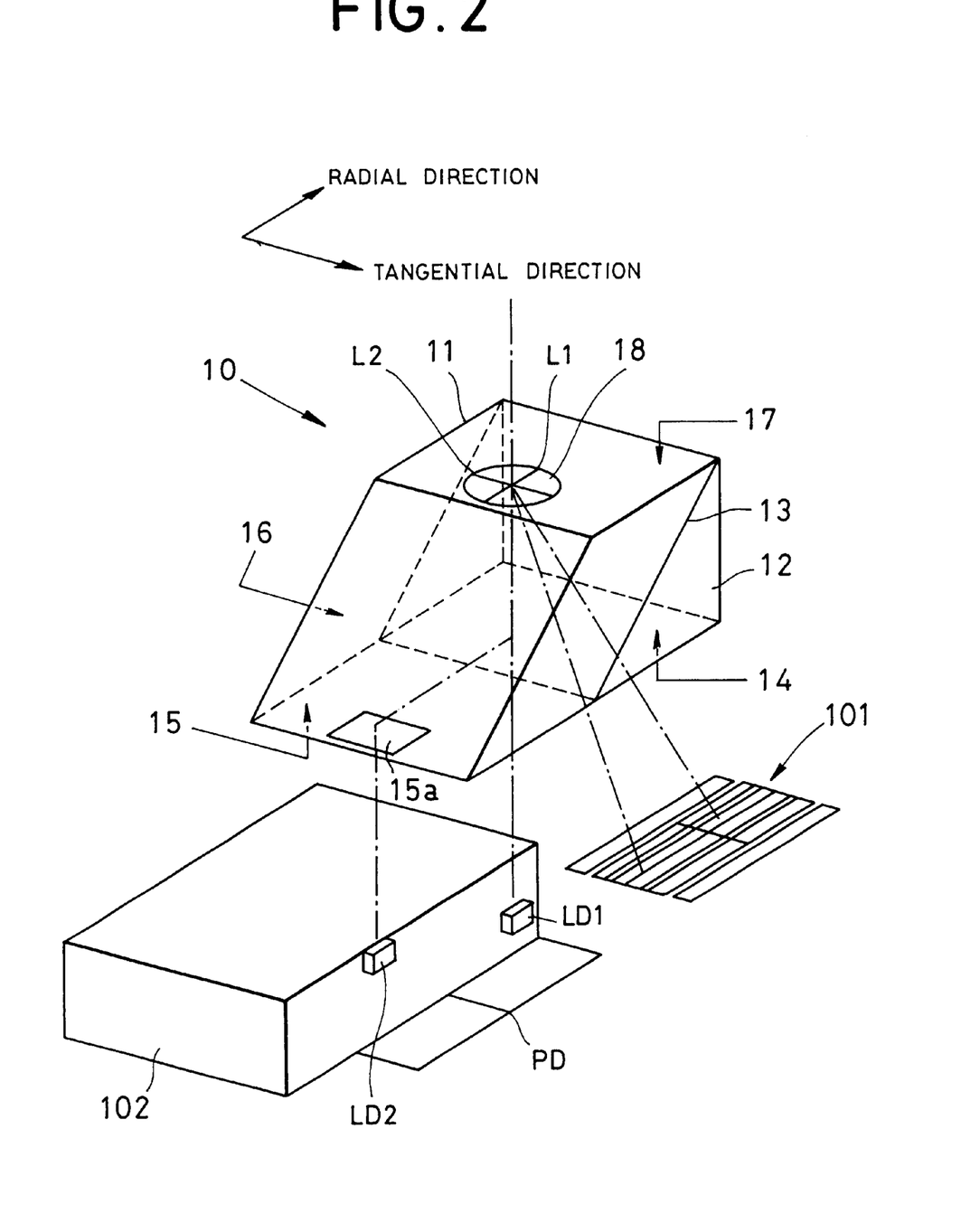
FIG. 2 is a schematic perspective view showing an internal structure of the optical pickup device using the optical axis coupling prism as the first embodiment of the invention.

As shown in FIG. 2, the optical axis coupling prism 10 of the optical system is designed so as to transmit the divergent laser beams from the semiconductor lasers LD1 and LD2 along a common light path. The optical axis coupling prism 10 is formed by joining a parallelepiped 11 and a triangle pole 12 made of a same translucent isotropic material by a dichroic mirror 13 and is a prism having a trapezoidal cross section as a whole in which the top side and the bottom side are parallel with each other.

As shown in FIG. 1, a plane of incidence 14 for the first semiconductor laser LD1 exists on the principal plane of the bottom side of the trapezoidal cross section of the optical axis coupling prism 10. A plane of incidence 15 for the second semiconductor laser LD2 is provided on a plane which intersects the plane of incidence 14 at a predetermined angle θ. The plane of incidence 15 is located at a position adjacent to the plane 14, with an edge of the dichroic mirror 13 serving as a boundary between them. The planes of incidence 14 and 15 are located on the same plane. The first and the second laser beams enter the planes of incidence 14 and 15 perpendicularly. The first laser beam, consequently, intersects and passes through the dichroic mirror 13. A reflection preventing film is formed on the inside surface of the plane of incident 14 for the first semiconductor laser LD1.

A grating surface 15a is provided on the plane of incidence 15 for the second semiconductor laser LD2. The grating surface 15a is used for the second laser beam having a wavelength 780 nm, namely, for reproduction of a CD. The grating surface 15a is used for what is called a 3-beam method whereby a center main beam and two sub beams on both sides thereof are generated, three light spots are formed on the optical disc, and intensities of the light returned therefrom are detected, thereby generating a tracking error signal. A reflection preventing film is formed on the inside surface of the plane of incidence 15 for the second semiconductor laser LD2.

The dichroic mirror 13 functions as a plane of synthesis for synthesizing the optical axes of the laser beams of two wavelengths. The dichroic mirror 13 is formed by a multi-layer dielectric thin film so as to have characteristics such that while the first laser beam having a wavelength 650 nm is transmitted, the second laser beam having a wavelength 780 nm is reflected and have incident angle dependency. This is because on the reciprocating path of both laser beams, by using a principle such that an angle of incidence of the return light to the dichroic mirror 13 is made different by a hologram provided on a plane of emission, which will be explained later, the light having a wavelength 650 nm is transmitted and the light having a wavelength 780 nm is reflected on the going path, and both of the light of two wavelengths are almost transmitted on the return path.

A reflecting surface 16 that is parallel with the dichroic mirror 13 is formed on the side of the optical axis coupling prism 10. The second laser beam is, therefore, reflected by the inner surface toward the dichroic mirror 13. Since the first and the second semiconductor lasers LD1 and LD2 are arranged so that cross points of the first and the second laser beams on the dichroic mirror 13 coincide, those optical axes coincide at positions behind the dichroic mirror 13. By arranging the reflecting surface 16 in parallel with the dichroic mirror 13 of the plane of synthesis, an error due to the deviation of the arranging position of the optical axis coupling prism can be absorbed.

In place of the grating surface 15a provided on the plane of incidence 15 for the second semiconductor laser LD2, a grating surface which is used for the 3-beam method can be formed on the reflecting surface 16 (refer to a grating surface 15b in FIG. 1). The optical axis coupling prism 10, therefore, has a first light separating device, namely, a grating surface which is arranged between the second plane of incidence 15 and the dichroic mirror 13 of the plane of synthesis and generates two sub laser beams which are deviated from the optical axis of the second laser beam.

As shown in FIG. 1, a plane of emission 17 to emit the laser beams in which the optical axes of the first and the second semiconductor lasers LD1 and LD2 coincide is formed on the principal plane of the upper side of the trapezoidal cross section of the optical axis coupling prism 10. A 4-split hologram 18 is formed on the plane of emission 17. The 4-split hologram 18 sets the laser beam that is emitted on the going path to a 0th order light which is not deflected and uses a primary light in which the return light entering on the return path is deflected, thereby separating the optical path of the reciprocating path and dividing the return light into four areas on the photo receiving surface of the photodetecting portion 101. The 4-split hologram 18 has two dividing lines L1 and L2, as boundary lines, which perpendicularly cross as shown in FIG. 2. In the four quadrant areas of the 4-split hologram 18, four corresponding almost fan-shaped light spot images are formed on the photo receiving surface of the photodetecting portion 101, respectively. Since the dividing lines L1 and L2 of the 4-split hologram 18 are along the axes corresponding to the radial direction and the tangential direction of the optical disc, it is possible to cope with the DPD (Differential Phase Detection) method to generate the tracking error signal. The 4-split hologram 18 is further designed so as to cause a focal point positional difference corresponding to an SSD (Spot Size Detection) method to generate a focusing error signal and a light spot image is formed on the photo receiving surface. To obtain the focal point positional difference, a pattern of the 4-split hologram 18 is formed by using, for example, a double-beam interference method. The focal point positional difference is obtained by recording an interference fringe of a spherical wave having a focal point at a position before or behind the photo receiving surface of the photodetecting portion 101 and a spherical wave from the focal point of the objective lens.

As mentioned above, the plane of emission 17 has the 4-split hologram 18 as a second light separating device for receiving the return light of the first and the second laser beams, dividing them to different positions on the photo receiving surface of the photodetecting portion 101, and converging them. The optical axis coupling prism 10, therefore, has: the first plane of incidence 14 where the first laser beam enters; the second plane of incidence 15 where the second laser beam enters; the plane of synthesis (dichroic mirror 13) to make the optical axes of the first and the second laser beams coincide; the plane of emission 17 to emit the first and the second laser beams of the optical axes which are made coincident through the plane of synthesis; and the reflecting surface 16 to reflect the second laser beam to the plane of synthesis. The prism 10 fundamentally effects three functions of a hologram function, a wavelength selecting function, and a grating function.

Figure 3:
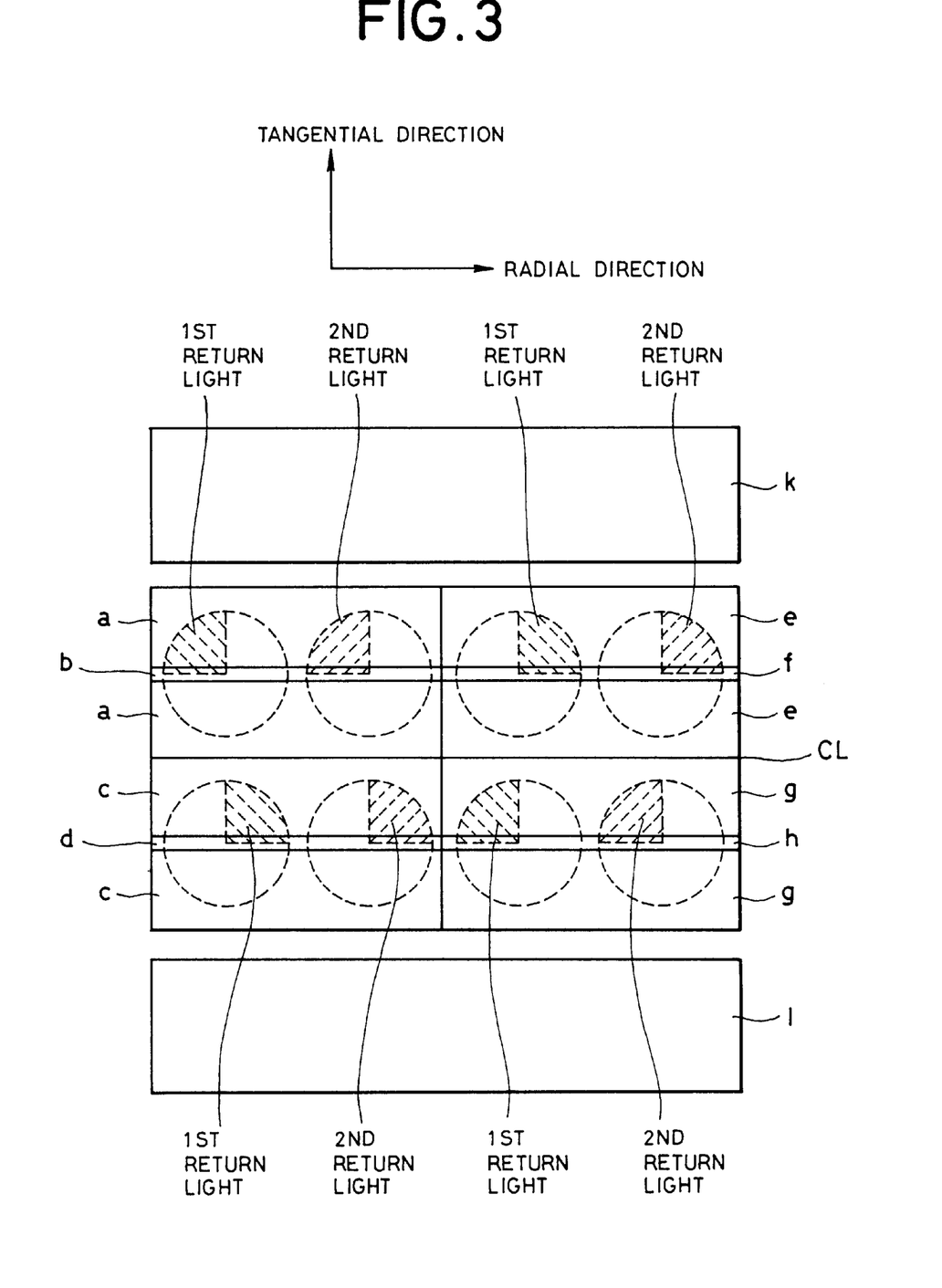
FIG. 3 is a plan view of a split photo receiving surface of a photodetector of the embodiment.

As shown in FIG. 3, the split photo receiving surface of the photodetecting portion 101 is arranged on the casing 103 along the axis corresponding to the radial direction of the optical disc together with the first and the second semiconductor lasers LD1 and LD2. The split photodetecting surface pattern of the photodetecting portion 101 is first mainly divided into three areas; namely, an area k, areas a to h, and an area l. As mentioned above, the photodetecting portion comprises: the a to h areas of the first photodetecting portion for receiving the return light of the first laser beam and generating the detection signal to form the tracking error signal of the differential phase detection method; and the k and l areas of the second photodetecting portion for receiving the return light of the second laser beam and generating the detection signal to form the tracking error signal of the 3-beam method. Portions to obtain the recording signal RF are the segments of the a to h areas and the sum of those outputs becomes the recording signal RF. To generate the focusing error signal, the return light of the first and the second laser beams are used and the outputs from the a to h areas are used.

To accomplish the generation of the focusing error signal by the spot size detection method in common with the return light of the first and the second laser beams, each of the a to h areas of the first photodetecting portion of the photodetecting portion has a long area extended in the direction corresponding to the radial direction of the optical disc so as to receive both of the first and the second return light.

The a to h areas of the split photodetecting surface of the photodetecting portion 101 are grouped into four segments which are largely divided in the directions corresponding to the radial direction and the tangential direction of the optical disc, namely, four sets of (a, b), (c, d), (e, f), and (g, h) and correspond to the differential phase detection method.

Each of the four split segments is divided into three portions by a boundary line corresponding to the radial direction of the optical disc and each of the three portions is used as a photo receiving surface corresponding to the spot size detection method. Each of the four split segments can be divided into two portions or can be made correspond to a Foucault's method to generate the focusing error signal.

Now assuming that reference characters k, a to h, and l of the segments of the k, a to h, and l areas indicate the corresponding outputs, the generation of various control signals is executed by the following arithmetic operations. For example, an arithmetic operation to generate a focusing error signal FE from the return light of the first and the second laser beams based on the spot size detection method is as follows.

$$FE=(a+d+e+h)-(b+c+f+g)$$

An arithmetic operation to generate a tracking error signal TE (for a CD) from the return light of the second laser beam based on the 3-beam method is as follows.

$$TE=k-l$$

To generate a tracking error signal TE (for a DVD) from the return light of the first laser beam based on the differential phase detection method, phases of outputs (a+b), (c+d), (e+f), and (g+h) are compared.

An outline of the recording and reproduction in the embodiment will now be described with reference to FIGS. 1 and 2. Upon reproduction of a DVD, the laser beam from the first semiconductor laser LD1 enters the first plane of incidence 14 of the optical axis coupling prism 10, passes through the dichroic mirror 13 which intersects the first plane of incidence 14 at a predetermined angle θ, for example, 45°, is emitted from the 4-split hologram 18 of the plane of emission 17, and is guided toward the objective lens 4. This is because the dichroic mirror 13 has characteristics adapted to transmit the first laser beam having a wavelength 650 nm. Although the 4-split hologram 18 mainly divides the laser beam into a 0th order diffracted light and a primary diffracted light owing to the diffracting function, the 0th order diffracted light is mainly guided. The first laser beam is converged toward the optical disc 5 by the objective lens 4 and a light spot is formed on a pit train on the information recording surface of the optical disc 5.

Upon reproduction of a CD or upon recording or reproduction of a CD-R, the laser beam from the second semiconductor laser LD2 passes through the second plane of incidence 15 of the optical axis coupling prism 10, is reflected by the inner surface of the reflecting surface 16, is reflected by the dichroic mirror 13, is emitted from the 4-split hologram 18 of the plane of emission 17, and is guided toward the objective lens 4. In the optical axis coupling prism, since either one of the first plane of incidence where the second laser beam having a long wavelength enters and the reflecting surface has a grating function to separate the incident light into three beams, the light reflected by the dichroic mirror 13 is a beam of the plus and minus primary diffracted light around the 0th order diffracted light. Since the dichroic mirror 13 has characteristics adapted to transmit the first laser beam having a wavelength 650 nm and reflect the second laser beam having a wavelength 780 nm, if the cross points of the first and the second laser beams on the dichroic mirror 13 are made coincident and the emitting direction of the first laser beam and the reflecting direction of the second laser beam are made coincident, the optical axis of the second laser beam can be made coincident with that of the first laser beam. The 0th order diffracted light of the second laser beam by the 4-split hologram 18 is mainly used, the second laser beam is converged toward the optical disc 5 by the objective lens 4, and a light spot is formed on the pit train on the information recording surface of the optical disc 5.

Both of the reflected light of the first and the second laser beams from the light spot on the optical disc recording surface enter the 4-split hologram 18 of the plane of emission 17 of the optical axis coupling prism 10 through the objective lens 4. The primary diffracted light of the return light is now used and is guided to the dichroic mirror 13 and is transmitted there, thereby forming a spot image onto the split photo receiving surface of the photodetecting portion 101 of the photodetecting portion from the first plane of incidence 14.

The dichroic mirror 13 is formed by a multilayer dielectric thin film so as to have the incident angle dependency of characteristics adapted to transmit the light having a wavelength 650 nm and reflect the light having a wavelength 780 nm at an incident angle of, for example, 45° and characteristics adapted to transmit the light having wavelengths 650 nm and 780 nm at an incident angle around, for example, 25°. The incident angle of the return light to the dichroic mirror 13 is set to different angles such as angle about 25° and 45° as an angle of incidence when the first and the second laser beams are irradiated by the 4-split hologram 18 of the plane of emission 17. With this method, by using the incident angle dependency, the light having a wavelength 650 nm can be transmitted and the light having a wavelength 780 nm can be reflected on the going path, while both of the first and the second laser beams having two wavelengths can be almost transmitted on the return path.

Since the wavelengths of the diffraction angles of the primary diffracted light of the return light of the first and the second laser beams by the 4-split hologram 18 of the plane of emission 17 differ, in order to receive the spot images of both of the return light in common, the split photo receiving surface of the photodetecting portion needs a long region extended in the direction corresponding to the radial direction of the optical disc.

Figure 4:
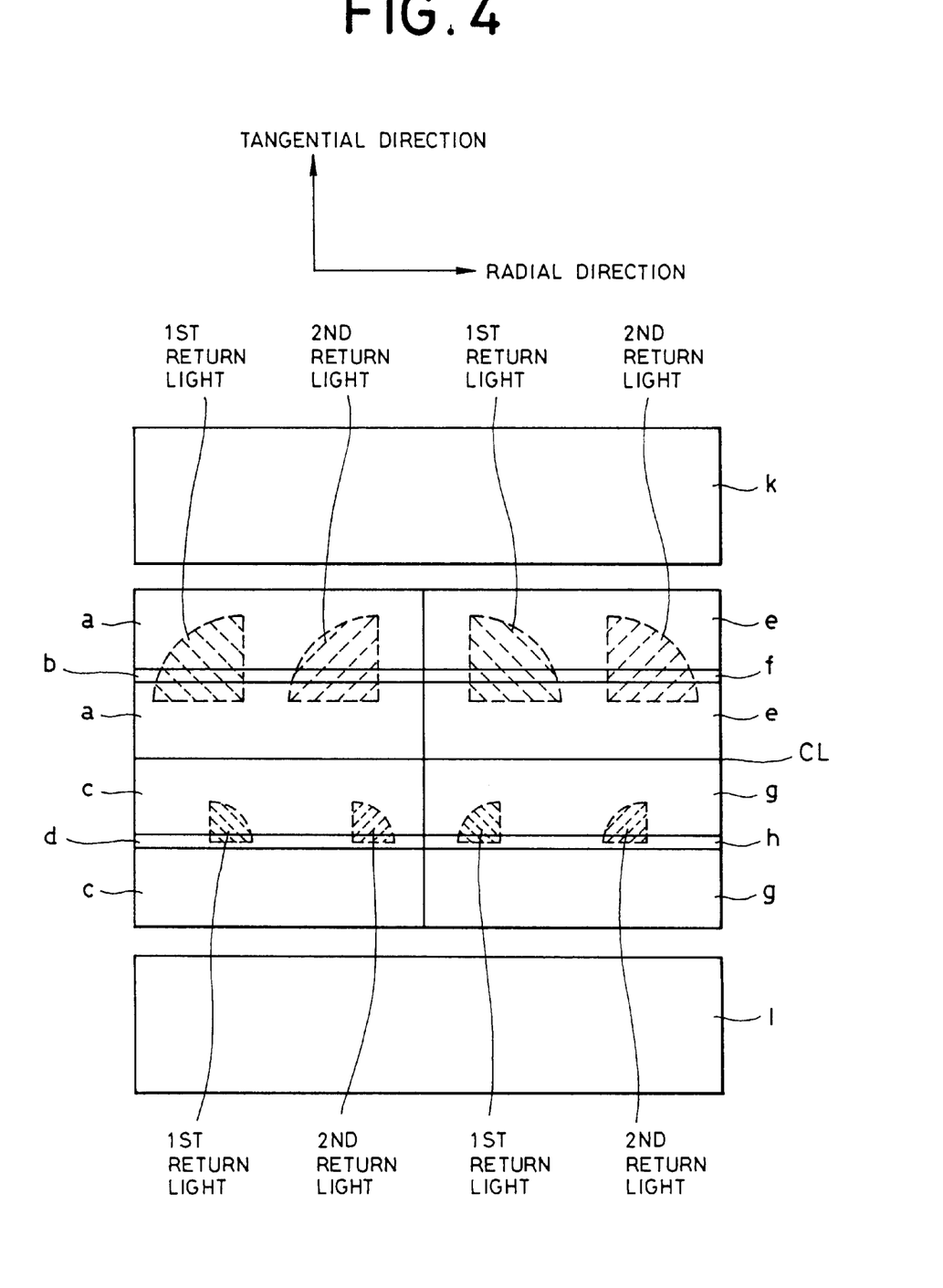
FIG. 4 is a plan view of the split photo receiving surface of the photodetector of the embodiment.
Figure 5:
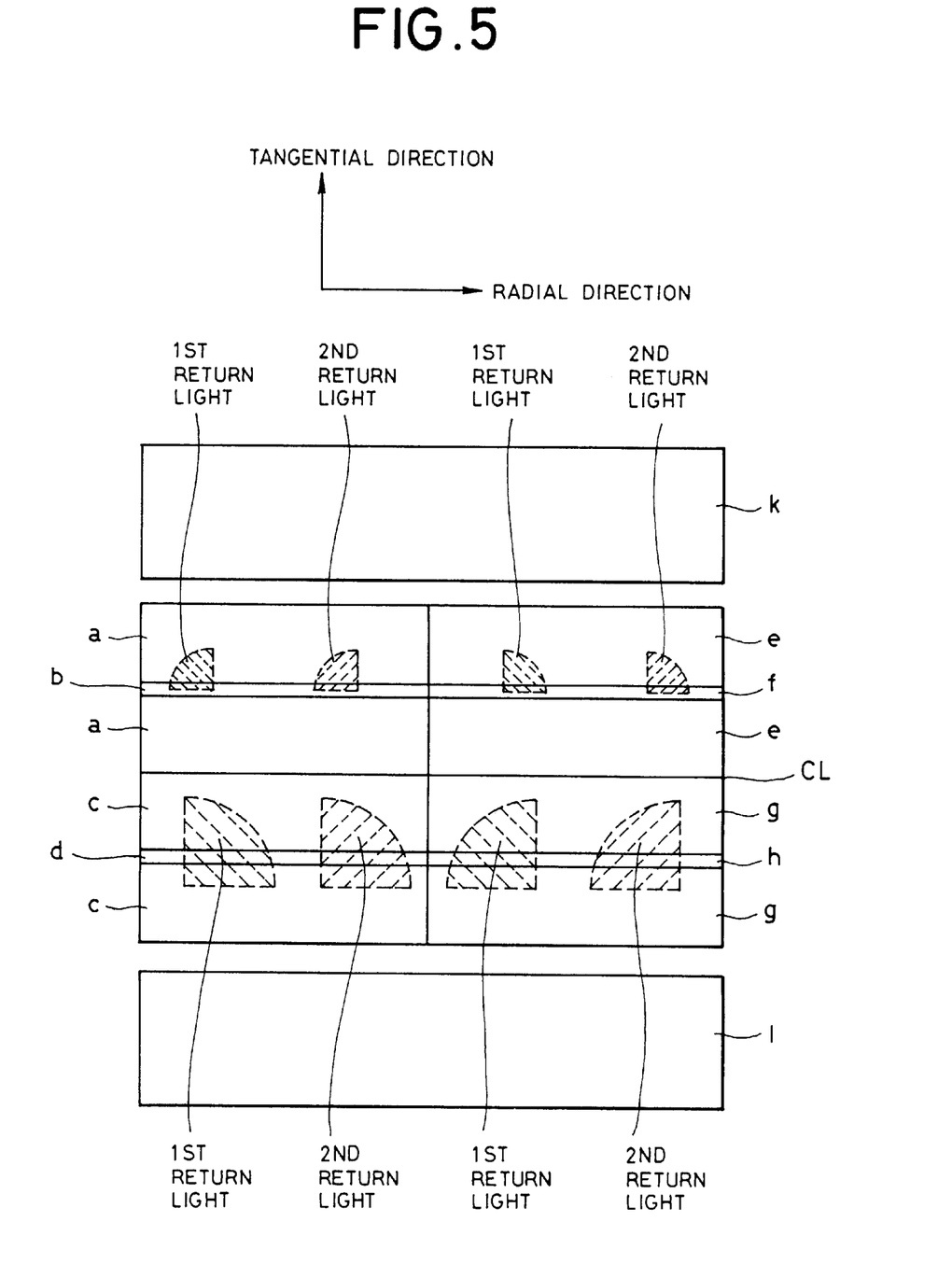
FIG. 5 is a plan view of the split photo receiving surface of the photodetector of the embodiment.

The generation of the focusing error signal by the spot size detection method will now be described with reference to FIG. 3. As for the a to h areas of the first photodetecting portion, both of the first and the second return light are received. At the time of the in-focusing state on the recording surface, light spots of sizes are formed on the split photo receiving surface of the photodetecting portion 101 in a manner such that distributions of the intensities of the light spots are symmetrical with respect to a photo receiving surface center line CL of the split photo receiving surface of the photo detecting portion 101, namely, symmetrical with respect to the line corresponding to the radial direction of the optical disc. The values, consequently, obtained by adding photoelectric conversion outputs of the segments divided by the center line CL are equal and a focusing error component is equal to "0" due to the above equation. When the beam is in an out-of focus state, since sizes of the light spots on the segments as shown in FIG. 4 or 5 are changed, phases of focusing error components obtained by adding the photoelectric conversion outputs are opposite.

In the optical pickup device of the invention, although the explanation has been made on the assumption that the objective lens is a finite specification objective lens as a prerequisite, it will be obviously understood that as for the objective lens, similar effects will be obtained by realizing an infinite lens system by arranging a condenser lens on the optical recording medium's side and arranging a collimator lens on the semiconductor laser side.

According to the invention as mentioned above, in the optical axis coupling prism, since the dichroic mirror of the plane of synthesis in which the optical axes of the first and the second laser beams are made coincident and the reflecting surface to reflect the second laser beam having a long wavelength are parallel, the error corresponding to the deviation of the arranging position of the first laser beam and the second laser beam can be absorbed. In the optical axis coupling prism, further, the grating function to separate the incident beam into three beams is provided for either one of the first plane of incidence where the laser beam having a long wavelength enters and the reflecting surface and the hologram function of the hologram having the dividing lines which are parallel with the tangential direction and the radial direction of the optical disc is provided for the plane of emission where the reflection light that is returned from the optical disc enters, so that the number of parts can be reduced. When the shape of the optical axis coupling prism is seen from the side, since it has a structure such that two optical devices of a parallelogram and a rectangular triangle are overlaid, there is an effect that the optical axis coupling prism can be easily manufactured or the like. According to the invention, further, since the semiconductor lasers are provided for the common supporting portion functioning as a heat sink, the heat radiation of a plurality of semiconductor lasers can be effectively performed. The optical pickup optical system, consequently, can be simplified.

What is claimed is:

1. An optical pickup device comprising:
   a main portion having a first light source to emit a first laser beam, a second light source to emit a second laser beam having a wavelength different from a wavelength of said first laser beam, and a photodetecting portion to receive first and second return light of said first and said second laser beams which are reflected and returned from an optical disc; and
   an optical axis coupling prism which is fixed to said main portion and has a first plane of incidence where said first laser beam enters, a second plane of incidence where said second laser beam enters, a plane of synthesis to make optical axes of said first and said second laser beams coincident, and a plane of emission to emit said first and said second laser beams which have passed through said plane of synthesis and whose optical axes are made coincident;
   wherein said optical axis coupling prism has a first light separating device, arranged between said second plane of incidence and said plane of synthesis, for generating two sub laser beams which are deviated from the optical axis of said second laser beam.

2. A device according to claim 1, wherein said optical axis coupling prism has a reflecting surface to reflect said second laser beam to said plane of synthesis.

3. A device according to claim 1, wherein said plane of synthesis is a dichroic mirror having an incident angle dependency.

4. A device according to claim 1, wherein said reflecting surface and said plane of synthesis are arranged in parallel.

5. A device according to claim 1, wherein said plane of emission and said first plane of incidence are arranged in parallel.

6. A device according to claim 1, wherein said first and said second planes of incidence are arranged in parallel.

7. A device according to claim 1, wherein said plane of emission has a second light separating device for receiving said first and said second return light and dividing and converging said first and said second return light to different positions on said photodetecting portion, respectively.

8. A device according to claim 7, wherein said second light separating device divides each of said first and said second return light into four light beams.

9. A device according to claim 7, wherein said photodetecting portion has:
   a first photodetecting portion for receiving said first return light and outputting a detection signal to form a tracking error signal of a differential phase detection method; and
   a second photodetecting portion for receiving said second return light and outputting a detection signal to form a tracking error signal of a 3-beam system.

10. A device according to claim 9, wherein said first photodetecting portion of said photodetecting portion has a region extended in the direction corresponding to the radial direction of the optical disc in order to receive both of said first and said second return light.

11. An optical pickup device comprising:
   a main portion having a first light source to emit a first laser beam, a second light source to emit a second laser beam having a wavelength different from a wavelength of said first laser beam, and a photodetecting portion to receive first and second return light of said first and said second laser beams which are reflected and returned from an optical disc; and
   an optical axis coupling prism which is fixed to said main portion and has a first plane of incidence where said first laser beam enters, a second plane of incidence where said second laser beam enters, a plane of synthesis to make optical axes of said first and said second laser beams coincident, and a plane of emission to emit said first and said second laser beams which have passed through said plane of synthesis and whose optical axes are made coincident;
   wherein said plane of emission has a second light separating device for receiving said first and said second return light and dividing and converging said first and said second return light to different positions on said photodetecting portion, respectively.

12. A device according to claim 11, wherein said optical axis coupling prism has a reflecting surface to reflect said second laser beam to said plane of synthesis.

13. A device according to claim 11, wherein said plane of synthesis is a dichroic mirror having an incident angle dependency.

14. A device according to claim 11, wherein said reflecting surface and said plane of synthesis are arranged in parallel.

15. A device according to claim 11, wherein said plane of emission and said first plane of incidence are arranged in parallel.

16. A device according to claim 11, wherein said first and said second planes of incidence are arranged in parallel.

17. A device according to claim 11, wherein said second light separating device divides each of said first and said second return light into four light beams.

18. A device according to claim 11, wherein said photodetecting portion has:

a first photodetecting portion for receiving said first return light and outputting a detection signal to form a tracking error signal of a differential phase detection method; and a second photodetecting portion for receiving said second return light and outputting a detection signal to form a tracking error signal of a 3-beam system.

19. A device according to claim 18, wherein said first photodetecting portion of said photodetecting portion has a region extended in the direction corresponding to the radial direction of the optical disc in order to receive both of said first and said second return light.

* * * * *